(Model.)
P. DRAIS.
Machine for Making Hog Rings.
No. 233,606. Patented Oct. 26, 1880.
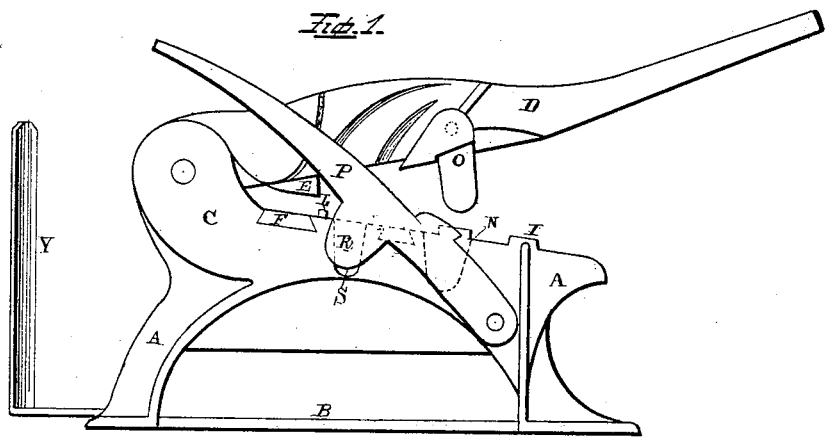
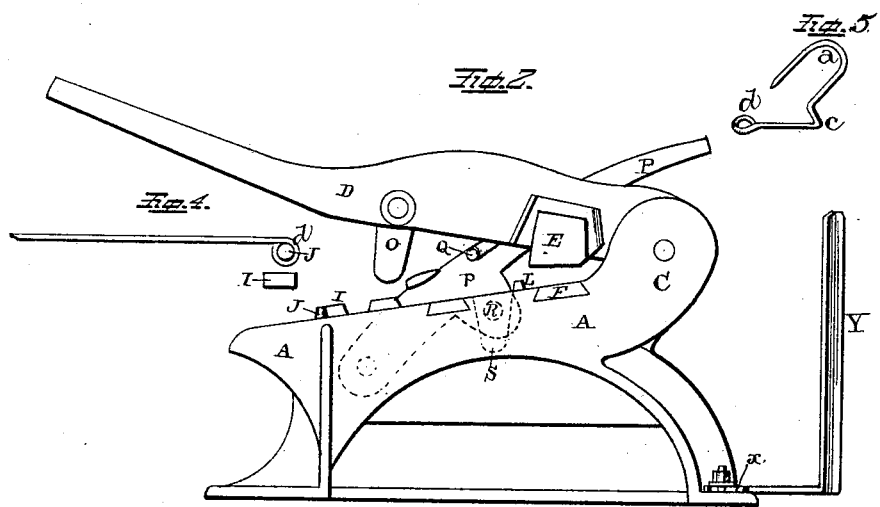
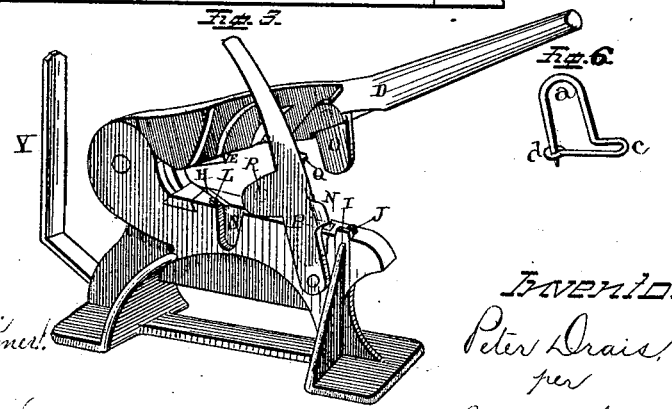
Witnesses
Wm. W. Mortimer
Chas. H. Isham
Inventor
Peter Drais
per
F. A. Lehmann,
Atty.

UNITED STATES PATENT OFFICE.

PETER DRAIS, OF WASHINGTON COURT-HOUSE, OHIO.

MACHINE FOR MAKING HOG-RINGS.

SPECIFICATION forming part of Letters Patent No. 233,606, dated October 26, 1880.

Application filed August 14, 1880. (Model.)

*To all whom it may concern:*

Be it known that I, PETER DRAIS, of Washington Court-House, in the county of Fayette and State of Ohio, have invented certain new and useful Improvements in Machines for Making Hog-Rings; and I do hereby declare the following to be a full, clear, and exact description of the invention, such as will enable others skilled in the art to which it pertains to make and use it, reference being had to the accompanying drawings, which form part of this specification.

My invention relates to an improvement in machines for making hog-rings; and it consists in a frame provided with a guide for regulating the length of the wire that is to be cut, a shear for cutting off the wire the proper length, a projection upon which the eye is formed in the wire, and another projection for holding the wire while it is being given the required shape by the two operating-levers, which are alternately brought into use, as will be more fully described hereinafter.

The object of my invention is to enable farmers and the owners of hogs to buy their own wire and manufacture it into rings, and thus save them the cost of buying them, as they have heretofore been compelled to do.

Figure 1 is a side elevation of my invention taken from one side. Fig. 2 is a similar view taken from the opposite side, and Fig. 3 is a perspective. Fig. 4 shows the wire having the eye formed on its end. Fig. 5 shows the shape of the ring after it is formed, and just ready to be inserted in the hog's nose. Fig. 6 shows the ring closed.

A represents a suitable iron frame, which has a long bar, B, extending along its bottom, and by means of which the machine can be secured to a bench or any other suitable support, by means of a suitable catch or other similar device, which extends over its top.

Pivoted at the end C of the machine is a lever, D, which is provided with the cutter E, which, in connection with the inlaid piece of steel F, forms the shear for cutting off the wire just the necessary length for forming a ring.

Pivoted to the base of the frame, at the same end to which the lever is pivoted, is the slotted adjustable guide Y, by means of which the proper length of the wire is regulated. This guide is slotted at $x$, so that it can be adjusted back and forth, according to the size of the ring that is to be made. The wire to be cut is laid in the groove H in the top of the machine, and is moved endwise until its outer end has touched this guide or stop Y, and then the lever D is forced downward, so as to cut the wire off. After the wire has been cut one end is inserted between the oblong projection I on the top of the frame and the smaller projection J, and then the wire is bent around by hand, so as to form the eye, as shown in Fig. 4. After the wire has been straightened, either by turning it over and bending it backward slightly or by means of a hammer on the bench or frame, the ring is ready to be formed.

Upon the top of the frame, near the end C, is formed a stud or projection, L, over which the eye of wire is made to catch as it lies upon the top of the frame ready to have the bend $a$ made in it. In the top of this frame there is made a recess, N, in which the first bend of the wire is formed by means of the pivoted projection O, which extends downward from the side of the lever D. As the wire lies upon the top of the frame, with its free end extending beyond the recess N, the lever D is forced downward and the pivoted projection O catches over the top of the wire and forces it down into the recess N, and thus forms the bend $a$. After this bend has been formed the lever D is raised upward, so as to leave the wire free to receive its second bend.

Pivoted upon one side of the frame A is a second shorter lever, P, which has a projection, Q, extending out from its inner side, so as to hold the eye of the wire being bent down over the stud or projection L, and thus prevent the wire from being forced out of position while the first bend is being given to it in the recess N. On the inner side of this lever, at a suitable distance nearer to its pivot, is another projection, R, which serves to force the wire down into the recess S, and thus give the wire its second bend, $c$. This lever P serves to hold the wire while it is being cut the proper length by bearing down upon the wire as it lies across the top of the frame, and also to hold it while it is being given its first bend by the lever D. After the wire has been forced down into the recess N by the movable projection O on the lever D this second lever P is forced down upon the wire, and this lower projection, R, forces the wire down into the recess S, so as to give the wire its second bend, c. After the wire has been formed into the shape shown, a pair of pinchers suitable for the purpose is used for closing the ring after it has been inserted in the hog's nose.

By means of this simple machine a boy can take wire and form it rapidly and perfectly into rings, and thus enable farmers and breeders to save themselves from fifty to seventy-five per cent. of the expense of buying manufactured rings, which are kept for sale at the stores.

The operation of my machine is as follows: The end of the wire from which the piece of wire is cut, out of which the ring is to be formed, is passed across the top of the frame A until its end touches the guide Y. This gives the length of the piece that is to be cut off to form the ring. (Shown in Fig. 6.) While the wire is extending across the top of the frame it rests in the groove H, and in order to hold it in place while being cut, the lever P is depressed, so that its projection R will catch over the top of the wire, and then the lever D is forced downward, so as to cut the wire off exactly the right length. The piece of wire that has been cut off is then taken in the hand, and one of its ends is placed between the two projections I J, and then the other end of the wire is swung around the round projection J, so as to form the eye d. The wire is straightened out after this bending, and then the eye is caught over the projection L, and the lever P is depressed, so that the projection Q will bear down upon the top of the eye, and thus prevent the eye from pulling off of the projection L while the first bend is being made. As the wire is thus held upon the top of the frame the projection R is down in the recess S under it, and the free end of the wire projects over and beyond the recess N. The lever D is then forced down upon the wire, and the pivoted projection O forces the wire down into the recess N and forms the first bend, a. The lever D is raised upward, so as to release the wire, and the lever P is also raised, so as to lift the wire both out of the recess N and off the projection L. The wire is then replaced on the projection L, but the bend a is not allowed to again catch in the recess N to any considerable extent, and then the lever P is depressed, so that the projection R will force the wire down into the recess S, and thus form the second bend, c. As the wire is thus bent it is in the form shown in Fig. 5, and after it has been inserted in the hog's nose it is closed by suitable pinchers, as shown in Fig. 6.

Having thus described my invention, I claim—

1. In a machine for making hog-rings, the combination of the frame A, the pivoted lever D, provided with a projection, O, for forcing the wire down into the recess N, with the lever P, provided with the projection R, for forcing the wire down into the recess S, and a projection, L, for holding the wire in position on the frame while being bent, substantially as described.

2. In a machine for making hog-rings, the combination of the frame A, having a recess, S, and a projection, L, with the pivoted lever P, having the two projections Q R on its inner side, the parts being arranged and combined to operate substantially as set forth.

In testimony that I claim the foregoing I have hereunto set my hand this 5th day of August, 1880.

PETER DRAIS.

Witnesses:
H. C. COFFMANN,
W. H. DIAL.